US010353464B2

(12) United States Patent
Skogö et al.

(10) Patent No.: US 10,353,464 B2
(45) Date of Patent: Jul. 16, 2019

(54) GAZE AND SACCADE BASED GRAPHICAL MANIPULATION

(71) Applicant: Tobii AB, Danderyd (SE)

(72) Inventors: Mårten Skogö, Danderyd (SE); Anders Olsson, Stockholm (SE); Erik Kenneth Holmgren, Uppsala (SE)

(73) Assignee: Tobii AB, Danderyd (SE)

( * ) Notice: Subject to any disclaimer, the term of this patent is extended or adjusted under 35 U.S.C. 154(b) by 108 days.

(21) Appl. No.: 15/608,336

(22) Filed: May 30, 2017

(65) Prior Publication Data

US 2018/0129280 A1 May 10, 2018

Related U.S. Application Data

(63) Continuation of application No. 14/197,171, filed on Mar. 4, 2014, now Pat. No. 9,665,171.

(Continued)

(51) Int. Cl.
*G06F 3/01* (2006.01)
*G09G 5/37* (2006.01)

(52) U.S. Cl.
CPC .............. *G06F 3/013* (2013.01); *G09G 5/37* (2013.01); *G09G 2320/0261* (2013.01);
(Continued)

(58) Field of Classification Search
CPC ......... G09G 2354/00; G09G 2330/022; G09G 2330/021; G09G 2320/0261; G09G 5/37;
(Continued)

(56) References Cited

U.S. PATENT DOCUMENTS

| 4,348,186 A | 9/1982 | Harvey et al. |
| 4,836,670 A | 6/1989 | Hutchinson |
| (Continued) | | |

FOREIGN PATENT DOCUMENTS

| WO | 98/33315 A2 | 7/1998 |
| WO | 2008134014 | 11/2008 |
| (Continued) | | |

OTHER PUBLICATIONS

Loschky and Wolverton, "How Late Can You Update Gaze-Contingent Multiresolutional Displays Without Detection?", ACM Transactions on Multimedia Computing, Communications and Applications, v. 3, No. 4, art. 25 (Dec. 2007). (Year: 2007).*

(Continued)

*Primary Examiner* — Julie Anne Watko
(74) *Attorney, Agent, or Firm* — Kilpatrick Townsend & Stockton LLP

(57) ABSTRACT

A system is disclosed which may include an eye tracking device and a processor. The eye tracking device may be for determining a gaze direction of a user. The processor may be configured to cause a first image to be displayed on a display device. The processor may also be configured to determine a velocity of a saccade by a user based at least in part on the gaze direction. The processor may further be configured to modify the first image to generate a second image based at least in part on the velocity of the saccade. Modifying the first image may include altering an image quality of an area of the first image, and the area may be selected based at least in part on the velocity of the saccade.

20 Claims, 6 Drawing Sheets

Related U.S. Application Data

(60) Provisional application No. 61/772,366, filed on Mar. 4, 2013.

(52) U.S. Cl.
CPC . *G09G 2330/021* (2013.01); *G09G 2330/022* (2013.01); *G09G 2354/00* (2013.01)

(58) Field of Classification Search
CPC ........ G09G 3/013; G09G 5/373; G06F 3/013; G06F 5/00; G06F 2203/011
USPC ........................................................ 345/156
See application file for complete search history.

(56) References Cited

U.S. PATENT DOCUMENTS

| | | |
|---|---|---|
| 5,583,795 A | 12/1996 | Smyth |
| 6,028,608 A | 2/2000 | Jenkins |
| 6,182,114 B1 | 1/2001 | Yap et al. |
| 6,252,989 B1 | 6/2001 | Geisler et al. |
| 6,351,335 B1 | 2/2002 | Perlin |
| 6,421,185 B1 | 7/2002 | Wick et al. |
| 6,798,443 B1 | 9/2004 | Maguire, Jr. |
| 7,027,655 B2 | 4/2006 | Keeney et al. |
| 7,572,008 B2 | 8/2009 | Elvesjo et al. |
| 7,573,439 B2 | 8/2009 | Lau et al. |
| 7,850,306 B2 | 12/2010 | Uusitalo et al. |
| 8,020,993 B1 | 9/2011 | Fram |
| 8,775,975 B2 | 7/2014 | Karmarkar et al. |
| 9,423,871 B2 | 8/2016 | Sukumar |
| 9,638,495 B2 | 5/2017 | Stanley |
| 9,665,171 B1 | 5/2017 | Skogo et al. |
| 9,727,991 B2 | 8/2017 | Guenter et al. |
| 2003/0067476 A1 | 4/2003 | Miller et al. |
| 2004/0207635 A1 | 10/2004 | Miller et al. |
| 2004/0227699 A1 | 11/2004 | Mitchell |
| 2005/0018911 A1 | 1/2005 | Deever |
| 2008/0111833 A1 | 5/2008 | Thorn et al. |
| 2010/0061553 A1 | 3/2010 | Chaum |
| 2012/0105310 A1 | 5/2012 | Sverdrup et al. |
| 2012/0156652 A1 | 6/2012 | Lane et al. |
| 2013/0321265 A1 | 12/2013 | Bychkov et al. |
| 2014/0247277 A1 | 9/2014 | Guenter et al. |
| 2015/0205126 A1 | 7/2015 | Schowengerdt |
| 2015/0338915 A1 | 11/2015 | Publicover et al. |
| 2015/0362991 A1 | 12/2015 | Koga et al. |
| 2017/0011492 A1 | 1/2017 | Thunström et al. |
| 2017/0123492 A1 | 5/2017 | Marggraff et al. |
| 2017/0235362 A1 | 8/2017 | Thunström et al. |
| 2017/0287112 A1 | 10/2017 | Stafford et al. |
| 2017/0287446 A1 | 10/2017 | Young et al. |

FOREIGN PATENT DOCUMENTS

| | | |
|---|---|---|
| WO | 2015/133889 A1 | 9/2015 |
| WO | 2018/057450 A1 | 3/2018 |

OTHER PUBLICATIONS

U.S. Appl. No. 14/197,171, Advisory Action dated Dec. 13, 2016, 5 pages.
U.S. Appl. No. 14/197,171, Final Office Action dated Jul. 28, 2016, 7 pages.
U.S. Appl. No. 14/197,171, Non-Final Office Action dated Dec. 24, 2015, 11 pages.
U.S. Appl. No. 14/197,171, Notice of Allowance dated Jan. 27, 2017, 9 pages.
U.S. Appl. No. 15/270,783, Ex Parte Quayle Action dated May 11, 2017, 9 pages.
U.S. Appl. No. 15/270,783, Non-Final Office Action dated Jan. 5, 2017, 15 pages.
Arnow et al., Foveated Visual Search for Corners, IEEE Transactions on Image Processing, vol. 16 Issue: 3, Mar. 2007, pp. 813-823.
Nystrom et al., Effect of Compressed Offline Foveated Video on Viewing Behavior and Subjective Quality, ACM Transactions on Multimedia Computing, Communications and Applications, vol. 6, issue 1, Feb. 2010, pp. 4:1-4:14.
Reingold et al., Gaze-Contingent Multiresolutional Displays: An Integrative Review, Summer 2003-Human Factors, vol. 45, No. 2, 2003, pp. 307-327.
U.S. Appl. No. 15/476,650, filed Mar. 31, 2017 Notice of Allowance dated May 21, 2018, all pages.
Guenter et al., "Foveated 3D Graphics", Microsoft Research, Retrieved from the internet: https://www.microsoft.com/en-us/research/publication/foveated-3d-graphics/, Nov. 20, 2012, 10 pages.
International Search Report and Written Opinion dated Jan. 29, 2018 for PCT/US2017/051993; all pages.

\* cited by examiner

GAZE AND SACCADE BASED GRAPHICAL MANIPULATION

CROSS-REFERENCE TO RELATED APPLICATIONS

This application is a continuation of Non-Provisional U.S. patent application Ser. No. 14/197,171 filed Mar. 4, 2014, entitled "GAZE AND SACCADE BASED GRAPHICAL MANIPULATION", which claims priority to Provisional U.S. Patent Application No. 61/772,366 filed Mar. 4, 2013, entitled "GAZE BASED GRAPHICAL MANIPULATION," the entire disclosures of which are hereby incorporated by reference, for all purposes, as if fully set forth herein.

BACKGROUND OF THE INVENTION

Graphical items may be used on a display to show data and information to a viewer. These graphical items may include text, images, and video. Graphical items in the area of computing are well known and have been in use for many years. Recently, showing three dimensional (3D) graphical items on a display has increased in importance in areas such as gaming, modeling and movies.

When displaying graphical items, a system such as a computer uses a processor in combination with memory to display the items on a screen or other display device. Methods for displaying graphical items vary, but typically they rely on a computer interpreting commands to control a graphics processing device that provides graphical items for display. The graphics processing device typically contains custom hardware for this purpose including a processor and memory. In some computer systems the graphics processing device is fully integrated, and in others it is provided as a separate component known as a graphics card.

Graphics processing devices have limits on their processing power, usually quantified in terms of the amount of graphical items that can be displayed on a screen at any given time. This is typically limited by the capabilities of the hardware embodying the graphics processing device, including processors, memory, and communication channels. Additionally, the amount of graphical items able to be displayed on a screen at a given point can be limited by communication limits between the graphics processing device and computer.

In many scenarios that require graphical items be displayed on a screen, a user only focuses on a portion of the screen, and therefore only a portion of the graphical items, an any given time. Meanwhile, other graphical items continue to be displayed on the remaining portions of the screen, which the user is not focused on. This wastes valuable graphics processing device resources to produce graphical items that cannot be fully appreciated by the user because the visual acuity of a human drops dramatically outside those images immediately focused on.

BRIEF DESCRIPTION OF THE INVENTION

In some embodiments, a system for presenting graphics on a display device is provided. The system may include an eye tracking device, at least one processor, and a graphics processing device. The eye tracking device may be for determining at least one of a gaze point of a user on a display device, or a change in the gaze point of the user on the display device. The at least one processor may be for receiving data from the eye tracking device and modifying use of at least one system resource based at least in part on the data received from the sys tracking device. The graphics processing device may be for causing an image to be displayed on the display device.

In another embodiment, a non-transitory computer readable medium having instructions thereon for presenting graphics on a display device is provided. The instructions may be executable by one or more processors to at least display an image on a display device. The instructions may also be executable to receive information from an eye tracking device indicative of at least one of a gaze point of a user on the display device, or a change in the gaze point of the user on the display device. The instructions may further be executable to modify use of at least one system resource based at least in part on the information received from the eye tracking device.

In another embodiment, a method for presenting graphics on a display device is provided. The method may include displaying an image on a display device. The method may also include receiving information from an eye tracking device indicative of at least one of a gaze point of a user on the display device, or a change in the gaze point of the user on the display device. The method may further include modifying use of at least one system resource based at least in part on the information received from the eye tracking device.

BRIEF DESCRIPTION OF THE DRAWINGS

The present invention is described in conjunction with the appended figures.

Figure 1:
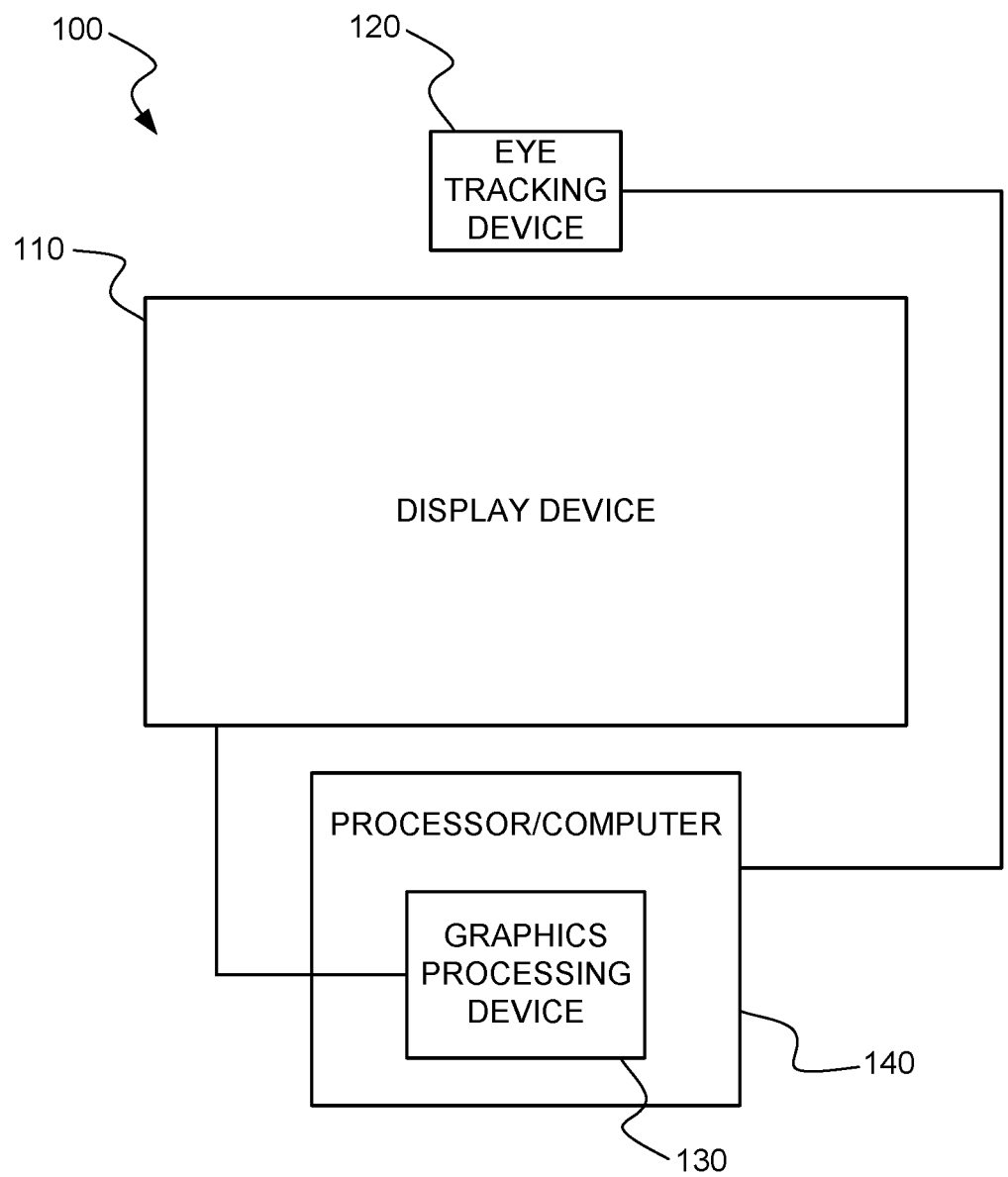
FIG. 1 is a block diagram of one possible system of the invention for modifying an image based on a user's gaze point.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments of the invention, and with reference to FIG. 1, a system 100 for presenting graphics on a display device 110 is provided. System 100 may include an eye tracking device 120 and a graphics processing device 130. In some embodiments, the system may also include a processor/computer 140 which communicates with, and controls, graphics processing device 130. In some embodiments, any function of graphics processing device 130 may be performed, in whole or in part, by processor/computer 140. Merely by way of example, eye tracking device 120 may be provided integral to, or in addition to, a personal computer 140 having graphics processing device 130 and a central processing unit (in some configurations, graphics processing device 130 and the central processing unit are integrated). In other embodiments, eye tracking device 120 may be provided integral to, or in addition to, a gaming console 140 or other device having graphics processing device 130 and a central processing unit. Examples of gaming consoles include those produced and available from Microsoft™, Nintendo™, or Sony™. Thus, embodiments of the invention may be applied to the presentation of graphics in any number of possible devices and applications, including video display, video games, video production and editing, video communications, computer aided drafting and design, etc.

Eye tracking device 120 may be for determining at least one of a gaze point of a user on display device 110, or a change in the gaze point of the user on display device 110. Eye tracking devices and methods, sometimes referred to as gaze detection systems and methods, include, for example, products produced and available from Tobii Technology AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed by the invention, regardless of the technology behind the gaze detection system. Eye tracking device 120 may employ its own processor or the processor of another device (i.e., processor/computer 140) to interpret and process data received. When an eye tracking device is referred to herein, both possible methods of processing data are referred to.

Graphics processing device 130 employed by various embodiments of the invention may be for causing an image to be displayed on display device 110. Graphics processing device 130 may modify what image is displayed on display device 110 based at least in part on the gaze point of the user on display device 110, or a change in the gaze point of the user on display device 110, as determined by eye tracking device 120. While in some embodiments a separate non-included or non-integrated display device will be controlled by the graphics processing device 130, other embodiments may include or integrate display device 110.

Figure 2:
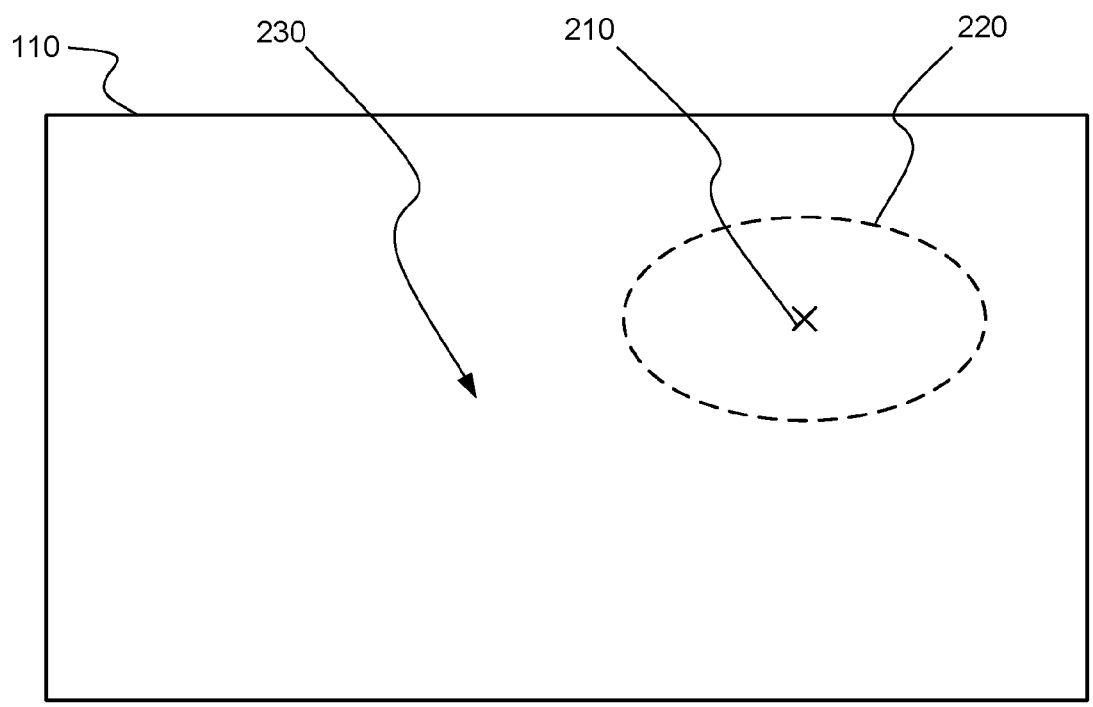
FIG. 2 is a view of a display device of the invention in which image modification is occurring in response to a user's gaze point.

The way in which the image displayed on display device 110 may be modified by graphics processing device 130 may vary depending on the embodiment, but regardless, the way in which the image is displayed may be intended to increase the image quality of portions of the image on which a user's gaze, or focused gaze, is directed, relative to those portions of the image to which the user's gaze, or focused gaze, is not directed. In this manner, the use of available resources of graphics processing device 130, and/or other system resources, are maximized to deliver image quality where it matters most on display device 110. To demonstrate, FIG. 2 illustrates a display device 110 showing a user's gaze point 210 and an area 220 around user's gaze point 210 in which embodiments of the invention may increase the quality of the image relative to the remaining area 230 of the display device 110. Thus, in various embodiments of the invention, the quality of the image produced across display device 110 may be increased in area 220 relative to remaining area 230.

When "modification" of an image presented on display device 110 is discussed herein, it shall be understood that what is intended is that a subsequent image displayed on display device 110, is different than a prior image displayed on display device 110. Thus, graphics processing device 130 and display device 110, or other device(s) discussed herein, "modify" an image by causing a first image to be displayed and then a second image to be displayed which is different than the first image. Any other change of an image discussed herein, for example, increasing or decreasing of image quality, shall also be understood to mean that a subsequent image is different than a prior image. Note that a change or modification of an image may include changing or modifying only a portion of the image. Thus, some portions of a prior image may be the same as a subsequent image, while other portions may be different. In other situations, the entirety of a prior image may be different than a subsequent image. It shall be understood that the modification of an area or an entirety of an image does not necessarily mean every finite portion of the area or entirety are changed (for example, each pixel), but rather that the area or entirety may be changed in some potentially consistent, predefined, or ordered manner (for example, the quality of the image is changed).

Increasing the quality of the image may include increasing the quality of any one or more of the below non-exclusive list of graphical characteristics, in addition to other possible characteristics known in the art:
  Resolution: The number of distinct pixels that may be displayed in one or more dimensions. For example, "1024×768" means 1024 pixels displayed in height and 768 pixels displayed in width.
  Shading: Variation of the color and brightness of graphical objects dependent on the artificial lighting projected by light sources emulated by graphics processing device 130.
  Texture-mapping: The mapping of graphical images or "textures" onto graphical objects to provide the objects with a particular look. The resolution of the textures influence the quality of the graphical object to which they are applied.
  Bump-mapping: Simulation of small-scale bumps and rough gradients on surfaces of graphical objects.
  Fogging/participating medium: The dimming of light when passing through non-clear atmosphere or air.
  Shadows: Emulation of obstruction of light.
  Soft shadows: Variance in shadowing and darkness caused by partially obscured light sources.
  Reflection: Representations of mirror-like or high gloss reflective surfaces.
  Transparency/opacity (optical or graphic): Sharp transmission of light through solid objects.
  Translucency: Highly scattered transmission of light through solid objects.
  Refraction: Bending of light associated with transparency.
  Diffraction: Bending, spreading and interference of light passing by an object or aperture that disrupts the light ray.
  Indirect illumination: Surfaces illuminated by light reflected off other surfaces, rather than directly from a light source (also known as global illumination).
  Caustics (a form of indirect illumination): Reflection of light off a shiny object, or focusing of light through a transparent object, to produce bright highlights on another object.
  Anti-aliasing: The process of blending the edge of a displayed object to reduce the appearance of sharpness or jagged lines. Typically an algorithm is used that samples colors around the edge of the displayed object in to blend the edge to its surroundings.
  Frame rate: For an animated image, the number of individual frames presented during a certain period of time to render movement within the image.
  3D: Visual and temporal characteristics of an image which cause the image to appear to be three dimensional to a viewer.

Figure 3A:
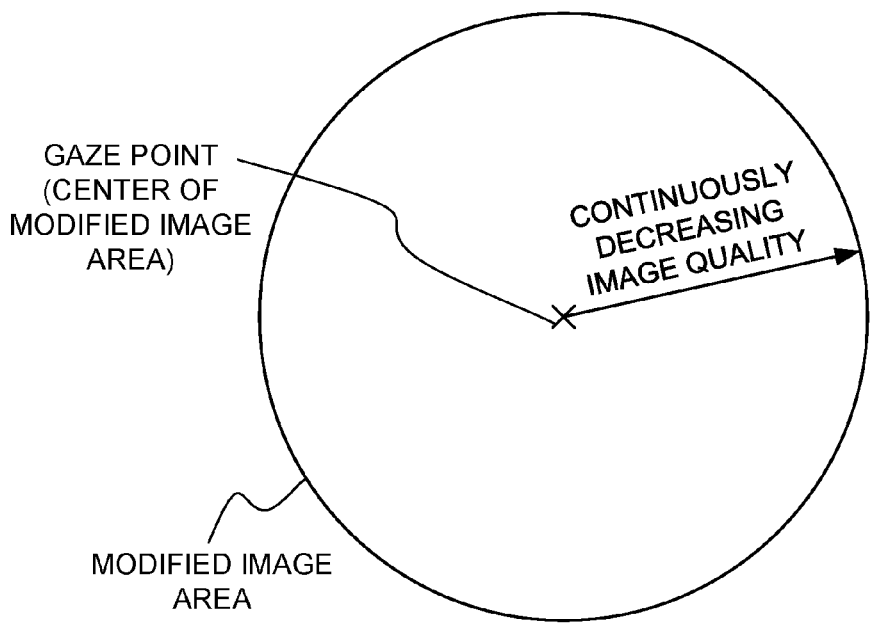
FIG. 3A is a diagram of how image quality may continuously vary within a modified image area.
Figure 3B:
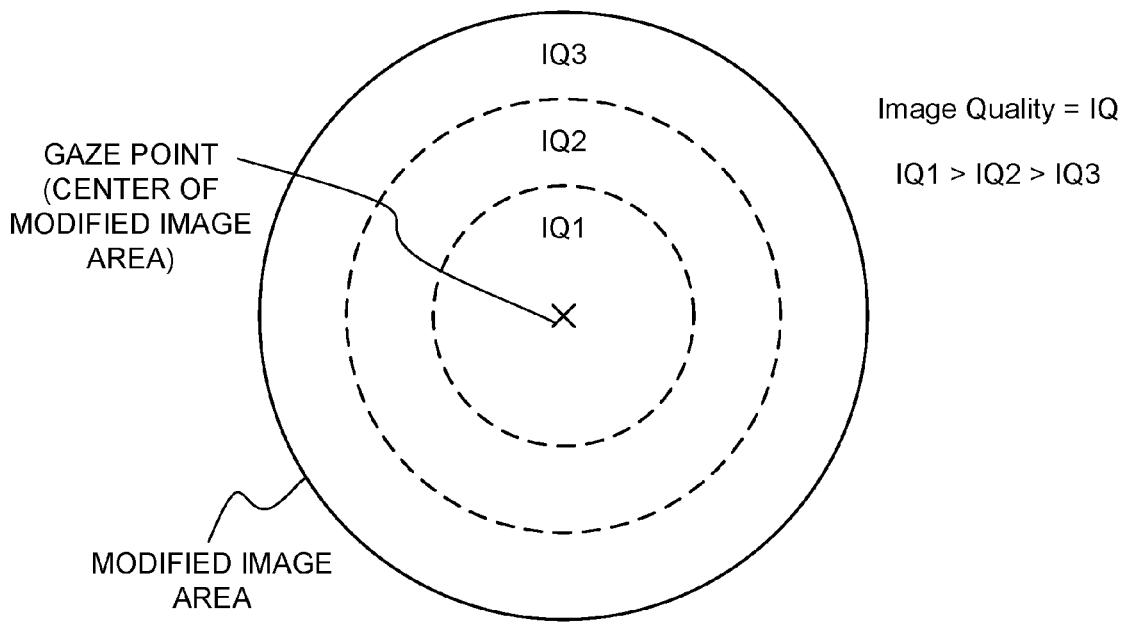
FIG. 3B is a diagram of how image quality may vary in steps within a modified image area.

The size and shape of the area of the image which may be modified to appear in greater quality can vary depending on the embodiment. Merely by way of example, the shape of the area may be circular, oval, square, rectangular, or polygonal. In some embodiments, the quality of the image within the area may be uniformly increased. In other embodiments, the increase in quality of the image may be greatest at the center of the area (i.e., proximate to the gaze point), and decrease towards the edges of the area (i.e., distal to the gaze point), perhaps to match the quality of the image surrounding the area. To demonstrate, FIG. 3A shows how image quality may decrease in a linear or non-linear continuous manner from the center of a gaze area outward, while FIG. 3B shows how image quality may decrease in a stepped manner from the center of a gaze area outward.

In some embodiments, modifying the image displayed on display device 110 may occur in response to the detection of a change in the gaze point. This may occur in a number of fashions, some of which are described below.

In some embodiments, an entirety of the image may be modified during the period of change in the gaze point of the user, and once the change in the gaze point of the user ceases, either the area around end gaze point of the user or a remainder of the image (portions of the image not around the end gaze point) may be modified. Merely by way of example, in one embodiment, the quality of the entire image may be increased during movement of the user's gaze (sometimes referred to as a saccade), but the increase in quality may only be sustained in an area around the user's end gaze point once the saccade is complete (i.e., the quality of the remainder of the image may be decreased upon completion of the saccade). In a different embodiment, the quality of the entire image may be decreased during a saccade, but the decrease in quality may only be sustained areas besides around the user's end gaze point once the saccade is complete (i.e., the quality of the area of the image around the user's end gaze point may be increased upon completion of the saccade).

Additionally, the use of other system resources, including for example processor/computer 140 and related resources, may also be modified during a user's saccade. For example, non-graphical operations may be supplemented by the resources of processor/computer 140 and graphics processing device 130, during a saccade. More specifically, during a saccade, non-graphical calculations necessary for other system operations may proceed at greater speed or efficiency because additional resources associated with processor/computer 140 and graphics processing device 130 are made available for such operations.

In some embodiments, modifying the image displayed on display device 110 may include modifying a portion of the image in an area around an anticipated gaze point of the user, potentially by increasing the quality thereof. The anticipated gaze point may be determined based on the change in the gaze point of the user. To determine the anticipated gaze point of a user, eye tracking device 120 and/or another processor (i.e, the computer or game consoler's processor), may determine a rate of the change in the gaze point of the user on display device 110, and determine the anticipated gaze point based at least in part on this rate of the change.

The rate of change of the gaze point of the user, also referred to as the velocity or speed of a saccade by the user is directly dependent on the total change in the gaze point of the user (often referred to as the amplitude of the saccade). Thus, as the intended amplitude of a user's saccade increases, so does the speed of the saccade. While the saccade of a human user can be as fast as 900°/second in humans, for saccades of less than or about 60°, the velocity of a saccade is generally linearly and directly dependent on the amplitude of the saccade. For example, a 10° amplitude is associated with a velocity of 300°/second and a 30° amplitude is associated with a velocity of 500°/second. For saccades of greater than 60°, the peak velocity starts to plateau toward the maximum velocity attainable by the eye (900°/second). In response to an unexpected stimulus, a saccade normally takes about 200 milliseconds (ms) to be initiated and then lasts from about 20 to about 200 ms. Based on these relationships between saccade speed and amplitude, embodiments of the invention may determine anticipated gaze points based on saccade velocity. Other predetermined models of mathematical relationships between saccade speed and amplitude may also be employed by various embodiments of the invention to determine an anticipated gaze point.

In some embodiments, the portion of the image modified around the anticipated gaze point may also include the portion of the image around the original gaze point (i.e., the gaze point from which the user's saccade started). While the shape of the portion of the image modified may be any of those shapes described above, in some embodiments it may be a triangle or a trapezoidal shape having a progressively greater width perpendicular to a direction of the saccade as shown in FIG. 4.

Figure 4:
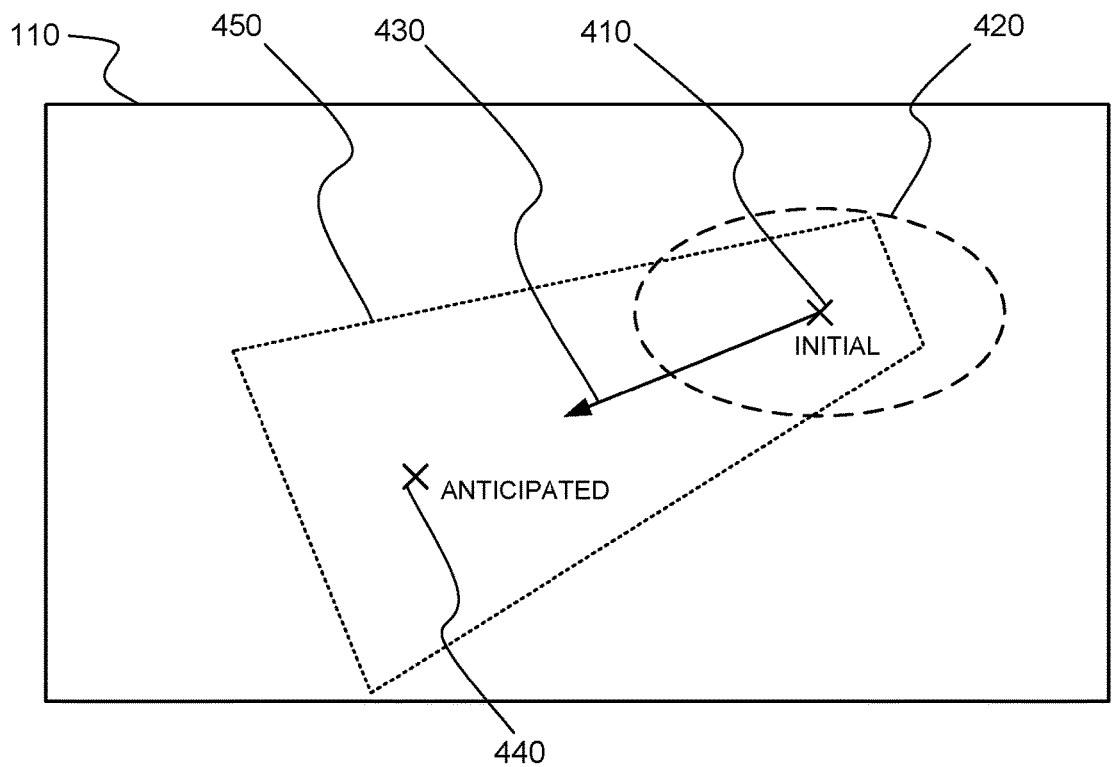
FIG. 4 is a view of a display device of the invention in which image modification is occurring in response to a detected change in a user's gaze point.

In FIG. 4, display device 110 is shown, and an initial user gaze point 410 is shown thereon. Prior to any change in initial gaze point 410, embodiments of the invention may provide increased graphics quality in area 420. When a user saccade, represented by arrow 430, is detected by eye tracking device 120, the size and shape of area 420 may change to accommodate both initial gaze point 410 and anticipated gaze point 440. The changed area 450, while being triangular and/or trapezoidal in this embodiment, may be shaped and sized differently in other embodiments. Merely by way of example, an entire side of display device 110 from the initial gaze point to the edges of the display in the direction of the saccade may also be included in changed area 450 to account for more possibilities of where the user's gaze point may end. In other embodiments, a circular, oval, or square changed area 450 may be provided. In yet other embodiments, changed area 450 may include separate and distinct areas around the initial gaze point 410 and anticipated gaze point 440.

In some embodiments, the size or shape of the area around the gaze point for which an image is modified (or which remains unmodified from a heightened quality in various embodiments), is dynamic. This may occur based at least in part on any number of factors, including the current location of the gaze point relative to the image or display device. Merely by way of example, if a user moves their gaze point to a certain portion of the screen, a predefined portion of the screen may be modified via increased quality therein (for example, a corner portion of the display having a map of a virtual area in a video game). In some embodiments, if enough user saccades having one or more predefined characteristics are detected in predefined amount of time, the entirety of the display may be modified to be rendered in greater quality.

In another embodiment of the invention, a non-transitory computer readable medium having instructions thereon for presenting graphics on display device 110 is provided. The instructions may be executable by one or more processors to at least display an image on display device 110. The instructions may also be executable to receive information from eye tracking device 120 indicative of at least one of a gaze point of a user on display device 110, or a change in the gaze point of the user on display device 110. The instructions may further be executable to cause graphics processing device 130 to modify the image displayed on display device 110 based at least in part on the gaze point of the user on display device 110, or the change in the gaze point of the user on display device 110. Thus, a non-transitory computer readable medium able to implement any of the features described herein in relation to other embodiments is also provided.

Figure 5:
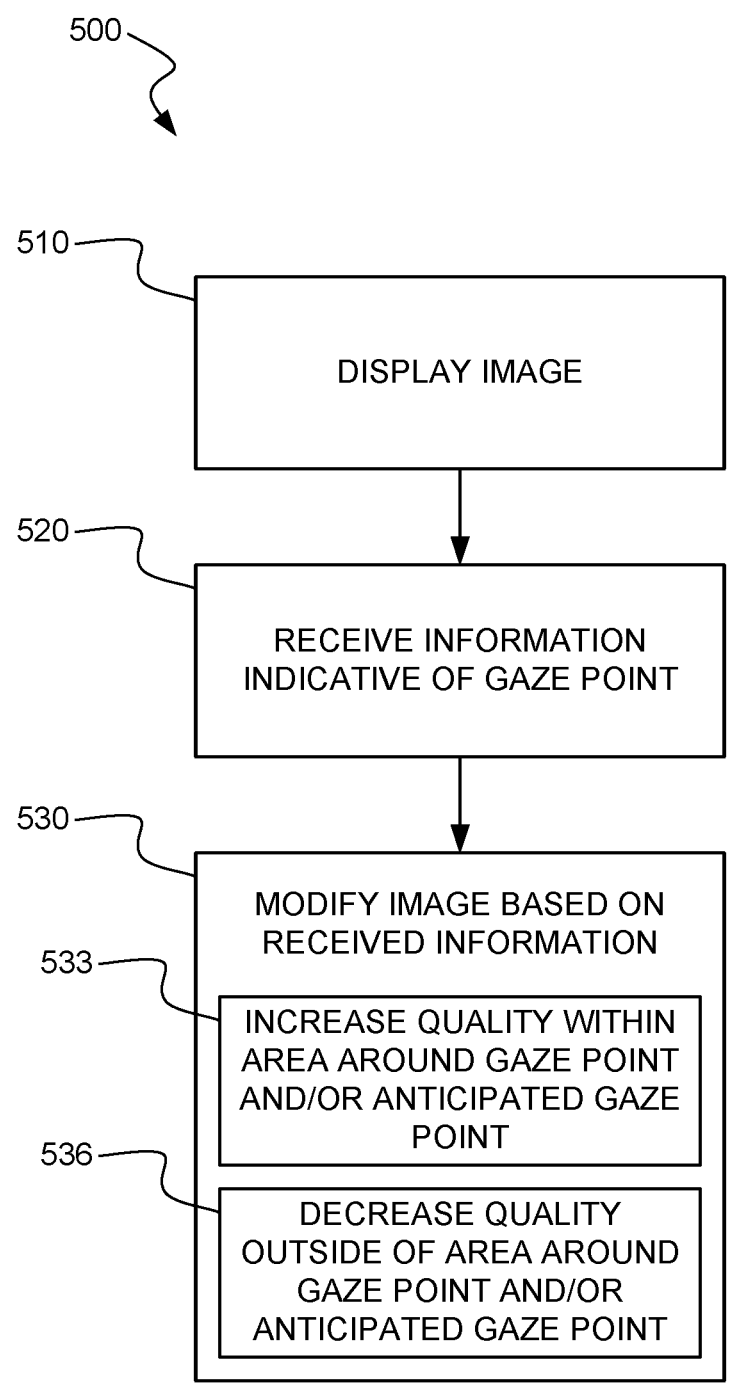
FIG. 5 is flow diagram of one possible method of the invention for modifying an image based on a user's gaze point.

In another embodiment of the invention, a method 500 for presenting graphics on display device 110 is provided as shown in FIG. 5. At step 510, method 500 may include displaying an image on display device 110. At step 520, method 500 may also include receiving information from eye tracking device 120 indicative of at least one of a gaze point of a user on display device 110, or a change in the gaze point of the user on display device 110. At step 530, method 500 may further include causing graphics processing device 130 to modify the image displayed on display device 110 based at least in part on the gaze point of the user on display device 110, or the change in the gaze point of the user on display device 110. Step 530 may include, at step 533, increasing the quality of the image in an area around the gaze point of the user, relative to outside the area. Step 530 may also include, at step 536, decreasing the quality of the image outside an area around the gaze point of the user, relative to inside the area. Thus, a method to implement any of the features described herein in relation to other embodiments is also provided.

In some embodiments, the systems and methods described herein may be toggled on and off by a user, possibly to account for multiple additional viewers of display device 110 being present. In other embodiments, the systems and methods described herein may automatically toggle on when only one user is viewing display device 110 (as detected by eye tracking device 120), and off when more than one user is viewing display device 110 (as detected by eye tracking device 120). Additionally, in some embodiments, the systems and methods described herein may allow for reduction in rendering quality of an entire display device 110 when no viewers are detected, thereby saving system resources and power consumption when display device 110 is not the primary focus of any viewer.

In other embodiments, the systems and methods described herein may allow for modifying multiple portions of an image on display device 110 to account for multiple viewers as detected by eye tracking device 120. For example, if two different users are focused on different portions of display device 110, the two different areas of the image focused on may be rendered in higher quality to provide enhanced viewing for each viewer.

In yet other embodiments, data associated with an image may inform the systems and methods described herein to allow prediction of which areas of an image may likely be focused on next by the user. This data may supplement data provided by eye tracking device 120 to allow for quicker and more fluid adjustment of the quality of the image in areas likely to be focused on by a user. For example, during viewing of a sporting event, a picture-in-picture of an interview with a coach or player may be presented in a corner of the image. Metadata associated with the image feed may inform the systems and methods described herein of the likely importance, and hence viewer interest and likely focus, in the sub-portion of the image.

Figure 6:
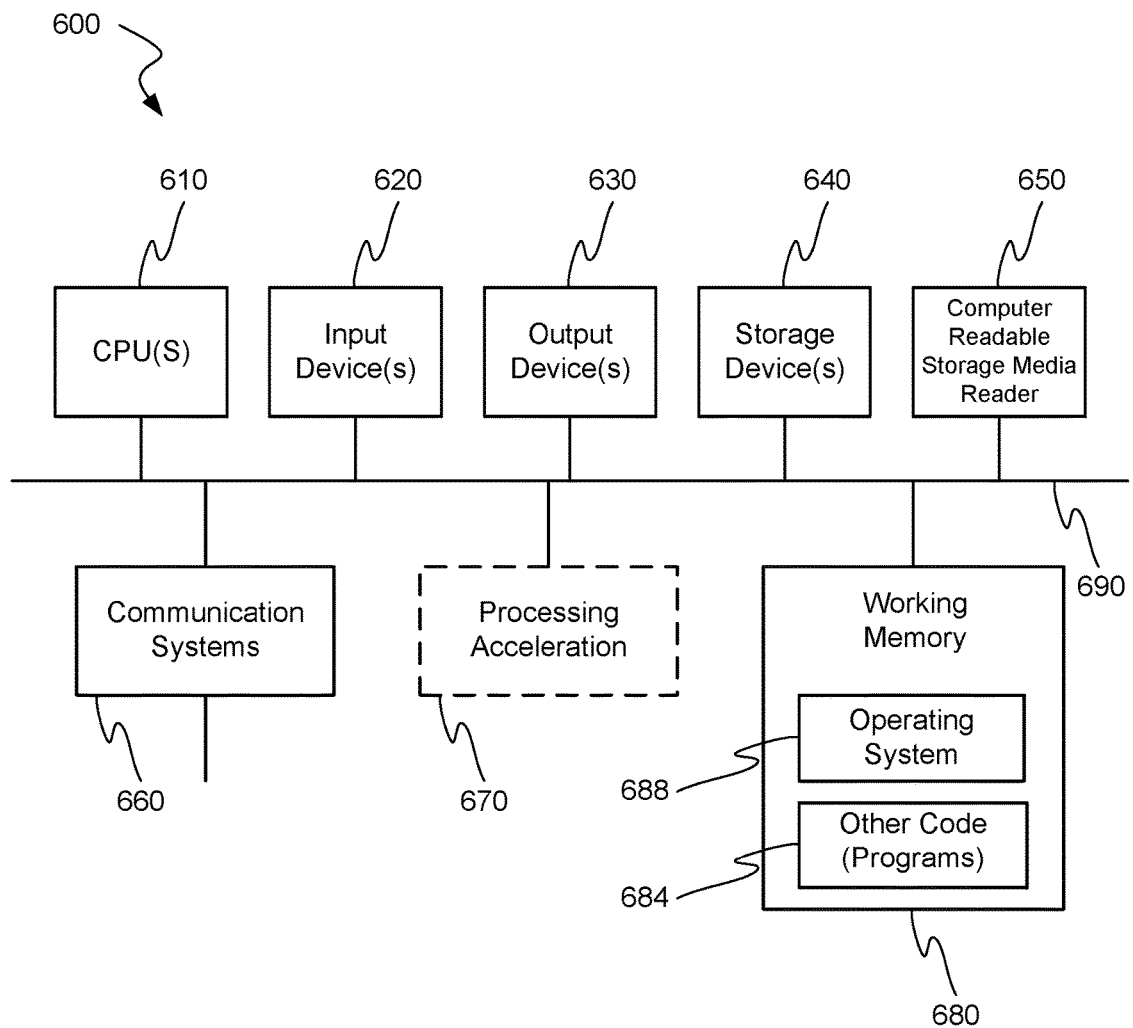
FIG. 6 is a block diagram of an exemplary computer system capable of being used in at least some portion of the devices or systems of the present invention, or implementing at least some portion of the methods of the present invention.

FIG. 6 is a block diagram illustrating an exemplary computer system 600 in which embodiments of the present invention may be implemented. This example illustrates a computer system 600 such as may be used, in whole, in part, or with various modifications, to provide the functions of eye tracking device 120, graphics processing device 130, the game console, the processor/computer 140, and/or other components of the invention such as those discussed above. For example, various functions of eye tracking device 120 and associated processors may be controlled by the computer system 600, including, merely by way of example, tracking a user's gaze point, determining an anticipated gaze point, controlling graphics processing device 130, etc.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage device 640. By way of example, storage device(s) 640 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of eye tracking device 120, graphics processing device 130, the game console, the processor/computer, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A system comprising:
   an eye tracking device for determining a gaze direction of a user; and
   one or more processors for:
   causing a first image to be displayed on a display device;
   determining a velocity of a saccade by the user based at least in part on the gaze direction; and
   modifying the first image to generate a second image based at least in part on the velocity of the saccade, wherein:
   modifying the first image comprises altering an image quality of at least one area of the first image; and
   the at least one area of the first image is selected based at least in part on the velocity of the saccade.

2. The system of claim 1, wherein altering the image quality comprises at least one selection from a group consisting of:
   increased resolution;
   increased shading quality;
   increased texture mapping quality;
   increased quality of reflection rendering;
   increased anti-aliasing;
   increased indirect illumination;
   increased frame rate; and
   increased three-dimensional quality.

3. The system of claim 1, wherein the at least one area of the first image being based at least in part on the velocity of the saccade comprises:
   a location of the at least one area of the first image being based at least in part on the velocity of the saccade.

4. The system of claim 1, wherein modifying the first image to generate the second image is based further on:
   a gaze point on the first image from which the saccade originated.

5. The system of claim 4, wherein the at least one area of the first image comprises:
   an area including the gaze point on the first image from which the saccade originated.

6. The system of claim 4, wherein:
   the at least one area of the first image is separate and distinct from a gaze area including the gaze point on the first image from which the saccade originated.

7. A method comprising:
   displaying a first image on a display device;
   receiving data from an eye tracking device;
   determining a velocity of a saccade of a user based at least in part on the data from the eye tracking device; and
   altering an image quality of at least one area of the first image to generate a second image, wherein the at least one area of the first image is based at least in part on the velocity of the saccade.

8. The method of claim 7, wherein the data comprises:
   a gaze direction.

9. The method of claim 8, wherein the at least one area of the first image comprises:
a gaze point on the first image where the gaze direction intersects the first image and an area surrounding the gaze point.

10. The method of claim 9, wherein:
the at least one area of the first image further comprises an anticipated area of the first image based at least in part on the velocity of the saccade.

11. The method of claim 8, wherein the gaze direction and surrounding area comprises a focus area.

12. The method of claim 11, wherein altering the image quality of at least one area of the first image comprises:
decreasing the image quality of the at least one area of the first image, wherein the at least one area of the first image is separate and distinct from the focus area.

13. The method of claim 12, wherein:
the focus area further comprises an area of the first image based at least in part on the velocity of the saccade.

14. The method of claim 12, wherein:
the first image comprises a first area with a first level of image quality;
the first image comprises a second area with a second level of image quality, wherein the second level of image quality is lower than the first level of image quality; and
modifying the image quality of the at least one area of the first image comprises modifying at least a portion of the second area of the first image such that the second image comprises the second area with an increased image quality over the second level of image quality.

15. The method of claim 7, wherein:
the at least one area of the first image comprises an area of the first image corresponding to a direction of the velocity of the saccade.

16. The method of claim 15, wherein the at least one area of the image increases in size in a dimension perpendicular to an intersection of the direction of the velocity of the saccade with the first image.

17. A non-transitory computer-readable medium having instructions stored thereon executable by a computing device to cause the computing device to perform operations comprising:
displaying a first image on a display device;
receiving data from an eye tracking device related to an initial gaze position and a saccade of a user;
determining a velocity of the saccade based at least in part on the data from the eye tracking device; and
modifying an image quality of at least one area of the first image based at least in part on the initial gaze position and the velocity of the saccade to produce a second image.

18. The non-transitory computer-readable medium of claim 17, wherein:
the at least one area of the first image is selected based at least in part on the initial gaze position and a direction of the velocity of the saccade.

19. The non-transitory computer-readable medium of claim 17, wherein modifying the image quality of the at least one area of the first image comprises:
decreasing the image quality of the at least one area of the first image, wherein the at least one area of the first image is separate and distinct from a gaze area including the initial gaze position.

20. The non-transitory computer-readable medium of claim 17, wherein the at least one area of the first image comprises:
an area of the first image corresponding to a direction of the velocity of the saccade.

* * * * *